April 22, 1930.  A. DINA  1,755,175
DOWSER OR DIAPHRAGM FOR MOTION PICTURE APPARATUS
Filed Sept. 5, 1925  3 Sheets-Sheet 1

INVENTOR
Augusto Dina
BY
*[signature]*
ATTORNEY

April 22, 1930.                     A. DINA                    1,755,175
             DOWSER OR DIAPHRAGM FOR MOTION PICTURE APPARATUS
                       Filed Sept. 5, 1925          3 Sheets-Sheet 3
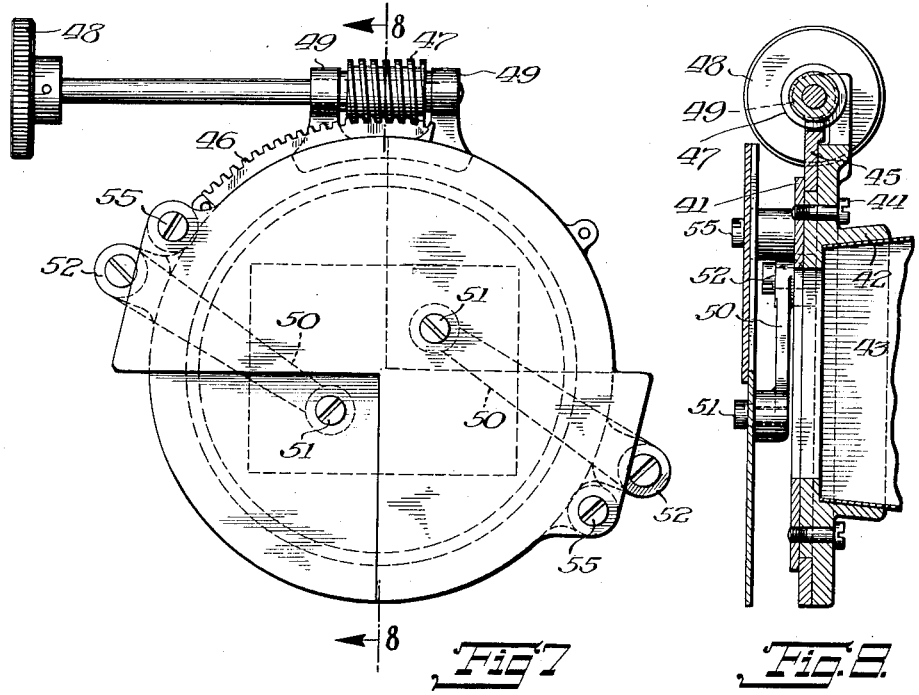
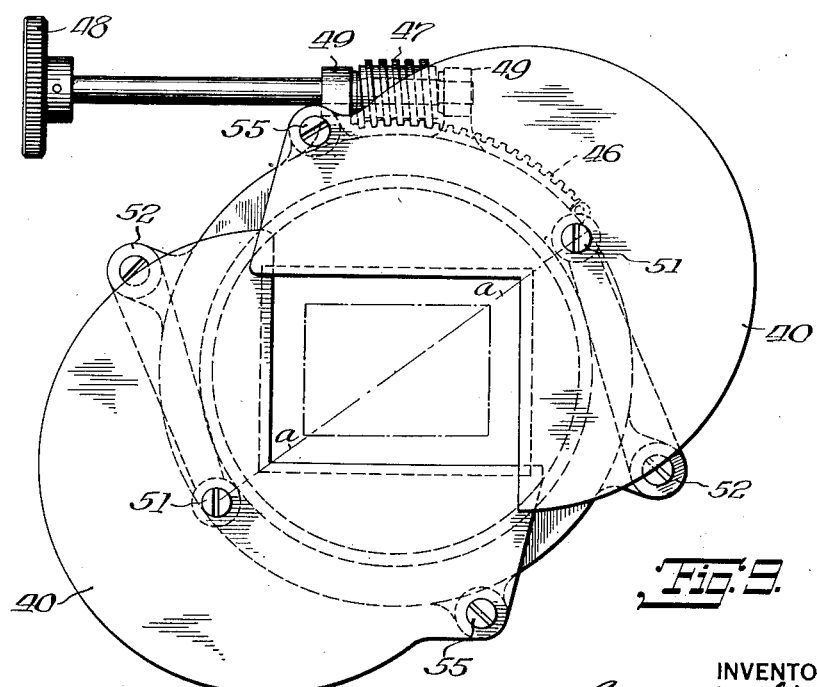
INVENTOR
Augusto Dina
BY
ATTORNEY Patented Apr. 22, 1930

1,755,175

UNITED STATES PATENT OFFICE

AUGUSTO DINA, OF JERSEY CITY, NEW JERSEY, ASSIGNOR TO THE PRECISION MACHINE CO., INC., OF NEW YORK, N. Y., A CORPORATION OF NEW YORK

DOWSER OR DIAPHRAGM FOR MOTION-PICTURE APPARATUS

Application filed September 5, 1925. Serial No. 54,623.

This invention relates broadly to closures and more particularly to shutter mechanism.

The improvement herein described pertains to a shutter mechanism for use as a dowser in motion picture cameras or projection machines; the primary aim of the invention being to improve and simplify the construction at present employed for intercepting the light rays passing to the film in a camera or to the screen in a projection machine.

While I shall described my invention as being particularly useful as a dowser in motion picture cameras and projection machines, it will be understood that the invention is capable of embodiment in whole or in part in similar and non-analogous arts, and therefore finds a wide field of utility for use in apparatus other than that described here.

Broadly, my invention includes the provision of an improved form of shutter, preferably arranged in sections which are adapted to move toward each other, the meeting edges of the sections moving in substantially straight or parallel lines with respect to a transverse axis of the opening, or in fact, parallel with respect to any diametrical line passing through the opening.

The principal objects and advantages which characterize the present invention reside in the provision of an improved shutter mechanism characterized by the embodiment therein of means for causing the sections thereof to move uniformly; the provision of a shutter mechanism wherein the sections thereof are bodily displaced to uniformly open or close an opening; the provision of a shutter mechanism wherein a section thereof is caused to move in a right line by rotary means; the provision of an improved shutter mechanism wherein the sections operate to increase or decrease the size of an opening simultaneously along at least two edges thereof; the provision of a shutter mechanism which operates to increase or decrease the size of an opening along all edges thereof uniformly; and the provision of an improved shutter operating mechanism including rotary actuating means and rectilinearly displaced shutter sections connected thereto.

A further object of my invention is to provide a structure of the type described which permits the shutter to be easily and quickly manipulated by a handle protruding from a convenient point for operation, and further provides a mounting for the shutter sections which continually hold the sections during their movement in a substantially fixed plane so that the opening is gradually closed or opened, and the light at the end of the closing movement of the shutter sections is quickly and completely shut off. A still further object of my invention is to provide a simple and inexpensive structure which is efficient and reliable in its operation.

Other objects and advantages of my invention will be apparent from the following detailed description of several convenient embodiments thereof when taken in connection with the accompanying drawings which form a part hereof.

In the drawings:

Figure 7 illustrates another convenient embodiment of my invention;

Figure 8 is a vertical section view taken along line 8—8 of Figure 7 and looking in the direction of the arrows; and Figure 9 is a view similar to Figure 7 but illustrating the shutter sections in open position.

Figure 1:
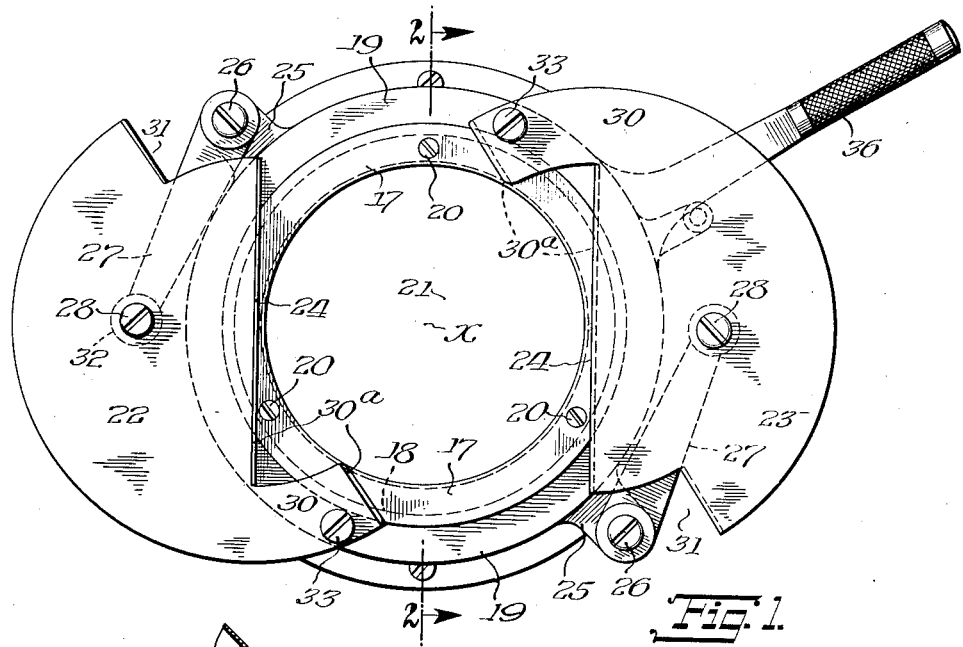
Figure 1 is a front elevational view of a shutter mechanism embodying my invention, the shutter in this view being in open position.
Figure 2:
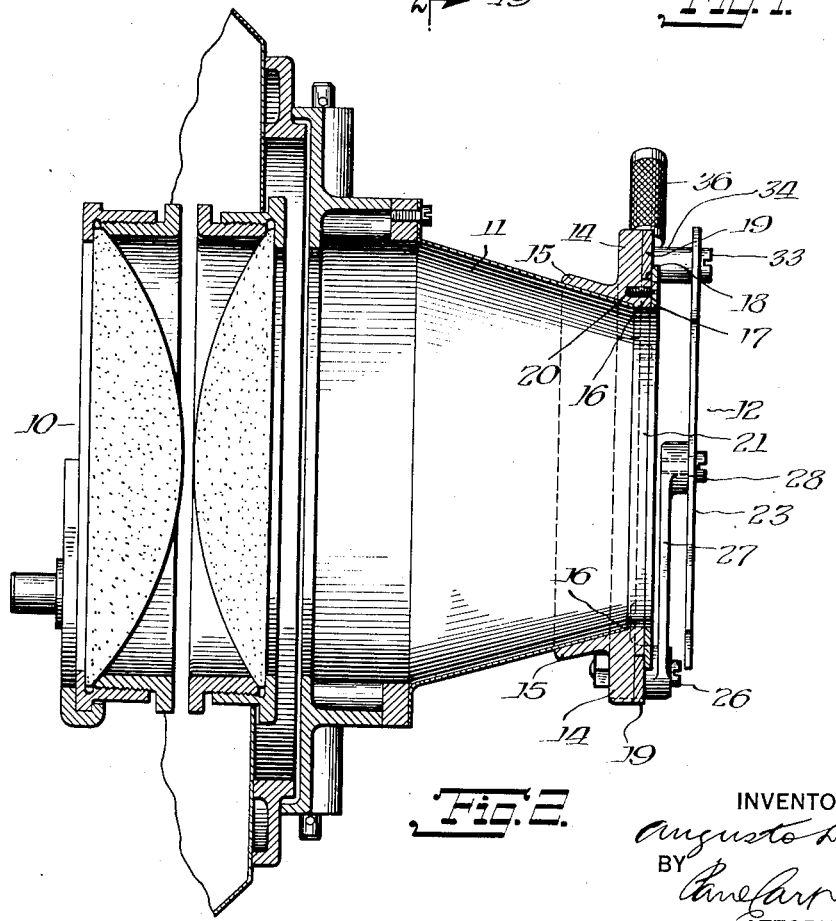
Figure 2 is a vertical cross sectional view of the same taken on line 2—2 of Fig. 1, and looking in the direction of the arrows.

Referring more particularly to the drawings and first to Figures 1 to 6 wherein I have illustrated one convenient embodiment of my invention, 10 designates the condenser of the lamp house of a motion picture projection machine, or may illustrate a lens holder of a camera. The structure for carrying either lens or condenser is well known to those skilled in the art and inasmuch as it forms no part of my invention, I deem it unnecessary to explain in detail the various features thereof. The projection machine is furnished with the light housing 11, which tapers slightly and receives at its end the shutter mechanism 12.

This shutter mechanism comprises an annular holder-like member 14 fixed to the end of housing 11. Member 14 may have a flange 15 which fits over the end of housing 11, a shoulder 16 being provided, however, against which the edge of flange 15 may abut. A ring plate 17 cooperates with member 14 to form an annular groove 18, in which a ring 19 is adapted to revolve. Screws 20 or other suitable fastening elements are used to secure ring plate 17 to the annular member 14.

The shutter is preferably of the sliding gate type. It is provided in two sections, each moving toward the center from opposite sides, when the light opening 21 is closed. These sections are designated 22 and 23, and are suitably carried by the ring 19 in a manner which permits their meeting edges 24 to move toward the center, and each other, in the present instance, said edges remaining parallel to each other and moving in a line parallel to the diameter of the opening, that is, in a line parallel to the horizontal axis and perpendicular to the vertical axis of the opening. Obviously, it is more convenient to furnish shutter sections 22 and 23 in equal diametrical halves, as shown in the drawings, but it is apparent that the exact shape or configuration of these sections are immaterial and that they may be changed as requirements may demand.

Figures 3, 4, 5, 6:
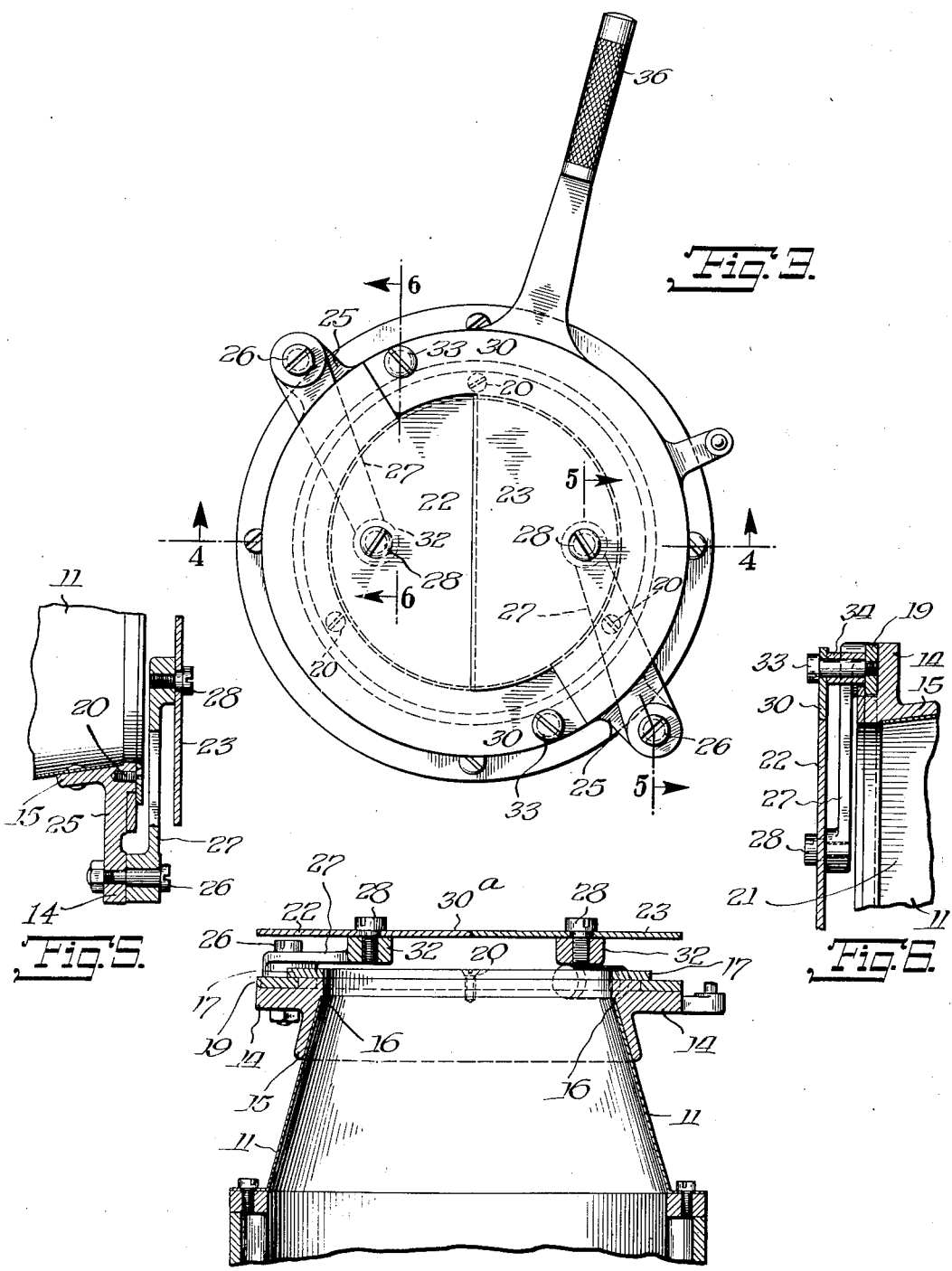
Figure 3 is a view at a slightly smaller scale illustrating the shutter in closed position.
Figure 4 is a horizontal sectional view taken on line 4—4 of Fig. 3.
Figure 5 is a detail sectional view taken on line 5—5 of Figure 3.
Figure 6 is a similar view taken on line 6—6 of Figure 3.

A pair of lugs 25 diametrically opposed to each other are fixed to annular member 14, and as shown in detail in Figure 5, these lugs may be formed integral with this member 14. Screws 26 are adapted to secure in pivotal relation the levers 27 to these lugs 25, which levers are similarly connected by screws 28 to a point 32 on shutter sections 22 and 23. These sections are preferably cut to form what might be termed an interlocking engagement when brought together so as to form a substantially continuous piece, this being apparent from Figs. 1 and 3. Edges 24 are not continued to the periphery, but are preferably provided with extensions 30 at one end, and at the other end with cut-a-way portions 31 for receiving the complemental extensions 30 on the opposite section. Accordingly, it will be observed that in order to obtain this interlocking engagement of the shutter sections, the vertical edges 24 must move parallel to each other.

At relatively opposite ends, each shutter section should preferably be pivotally connected to ring 19, such as by provision of the screws 33. Upon reference more particularly to Figure 6, wherein this connection is shown in detail, it will be noted that these screws 33 pass loosely through the shutter sections at the extensions 30 and thread into the ring 19, a collar 34 being provided on each screw between the shutter section and ring. Hence, when the ring 19 is rotated to close the shutter by a suitable handle 36 secured to the ring, the sections 22 and 23 will move forward toward the center, the fastening screws 33 moving with the ring while the rest of each section will be carried forward on the ends of levers 27. The movement of each section might be slightly rotary due to the connection 33 with ring 19, but this will not interfere with its parallel movement with respect to the vertical line passing through the center of the opening due to the function of the levers 27. Lugs 25 remain stationary during the opening and closing movements of the shutter sections and consequently, the levers 27 are forced to swing the shutters on their ends forwardly, so as to follow the connections 33 as they revolve with ring 19. This takes place as described, because the distance from the pivots 26 to pivots 28 and from the axis X to the screws 33 are equal.

Once closed in their interlocking engagement, the shutter sections may be opened only by an intended movement of handle 36. A tight fit of the edges 24 is obtained, so that the light is effectively and completely shut off, this being shown in detail in Figure 4. The edges may cut to overlap as indicated at 30$^a$. The shutting off action starts of course from opposite sides so that on the screen the light grows smaller towards the center of the picture from the two sides until completely shut off.

In Figures 7 to 9 inclusive, another convenient form of shutter structure embodying the principles of my invention is shown. Here the shutter sections are such that when they are moved to closed position the light grows smaller towards the center from all sides. This arrangement also permits smaller framing and also smaller pictures when photographing and permits of superimposing and shadow photography. In this form each shutter section 40 is approximately three-fourths of a complete disc and moves toward the opposite section along the diagonal line of the rectangular opening substantially as indicated at dotted lines at a—a. Substantially the same form of mounting is furnished for these sections 40. A ring plate 41 is secured to an annular member 42 at the end of housing 43 by means of screws 44. A ring 45 rides in the groove thus formed and is furnished with a segment 46 along a portion of its periphery for cooperation with a worm 47. The worm 47 may be fixed to an operating handle 48 supported in bearings 49 carried on member 42.

Levers 50 are likewise provided to connect points 51 on shutter sections 40 to the fixed lugs 52. Screws 55 pivotally fasten the other end of each section to ring 45 which are the movable points of these sections, as they are rotated around with the ring when it is revolved by turning handle 48. In a similar manner the levers 50 function to swing the opposite ends of the shutter sections forward so that each shutter moves bodily forward along the diagonal line of the rectangular opening, which preferably maintains its rectangularity in full open or closed and in all intermediate positions.

From the foregoing description it will be seen that I have provided an improved form of shutter mechanism capable of shutting off the light partially or completely from the front of the lamp house of a motion picture machine or for changing the amount of light admitted to the film in a camera. The mechanism is simple and functions to diminish the size of the opening from the outer sides so that the light grows smaller toward the center until completely shut off. This provides of course a structure in which the shutter sections slide toward each other and in this respect I prefer that the meeting edges travel parallel to each other, as well as parallel to a diametrical line passing through the center of the opening. This diametrical line may be the vertical or horizontal axis of the opening, or it may be at any angle through the center, but in any event I have reference to a fixed line.

Having thus described my invention and illustrated its use, I claim:

1. In a device of the character described, a frame defining an opening, a revoluble member bordering said opening, and a shutter including a section movable in a rectilinear plane and having a relatively fixed pivotal connection to said revoluble member.

2. In a device of the character described, in combination, a frame defining an opening, a shutter section having one straight edge, a revoluble element adjacent thereto, and means including a movable pivot and link member for connecting the shutter section to said revoluble element to cause the shutter section to be displaced with the said straight edge in substantially fixed parallelism with a predetermined diameter line of said opening rectilinearly upon rotation of said revoluble element.

3. In a device of the character described, in combination, a frame defining an opening, a shutter section having one straight edge, a revoluble element adjacent thereto, and means for pivotally connecting the shutter section to said revoluble element including an angularly displaceable member to cause the shutter section to be displaced rectilinearly upon rotation of said revoluble element.

4. In a device of the character described, in combination, a frame defining an opening, a shutter including a plurality of complemental sections each having one straight edge, a revoluble element adjacent thereto, and means for connecting the shutter sections to said revoluble element including an angularly displaceable link member to cause such sections to be relatively displaced rectilinearly upon rotation of said revoluble element.

5. In a shutter mechanism, the combination with a housing provided with an opening therein, of shutter means supported over said opening comprising complemental shutter sections adapted when moved together to close said openig, and means for actuating said shutter sections to open and closed positions, said means including moving pivots and stationarily pivoted links imparting a movement to said shutter sections whereby their meeting edges are moved both parallel to each other and to a substantially diametrical line passing through the center of said opening.

6. In a shutter mechanism, the combination with a housing provided with an opening therein, of shutter means supported adjacent said opening comprising complemental shutter sections adapted when moved together to close said opening, and means for actuating said shutter sections to open and closed positions, said means comprising a collar slidably mounted about the exterior of said housing adjacent said opening, means for connecting the advancing ends of each shutter section to said collar, and means for providing an additional connection with each shutter section for causing said sections to follow said advancing ends so as to impart a substantially parallel movement to the inner edges of said shutter sections.

7. In a shutter mechanism, the combination with a housing provided with an opening therein, of shutter means supported adjacent said opening comprising complemental shutter sections adapted when moved together to close said opening, and means for actuating said shutter sections to open and closed positions, said means comprising an actuating element relatively movable on said housing, pivotal connections between said element and said shutter sections, stationary lugs projecting from said housing, and lever members interconnecting said stationary lugs with said shutter connections.

8. Mechanism of this type described comprising a pair of complemental shutter sections adapted to move to closed position and providing a light proof enclosure over said opening, said shutter sections having substantially straight interconnecting edges extending part way across the central portion thereof, said shutter sections then being offset slightly with interconnecting curved edges radially disposed whereby when closed said shutter sections are provided with a positive interlocking engagement preventing accidental separation of said shutter sections, said straight and radially interconnecting edges being so cut as to provide an overlapping engagement therebetween.

9. In a shutter mechanism of the type described, a housing having an opening therein, a pair of complemental shutter sections for closing said opening, means for imparting a closing movement to said shutter sections comprising an annular member rotatably mounted on said housing connecting to said shutter sections, and links connected between said housing and each shutter section, said links each being provided with an effective leverage arm equal to the radial distance between the center of said annular member and its point of inter-connection with said shutter sections whereby said shutter sections are caused to move substantially parallel throughout their closing movement.

10. In a shutter, a frame defining an opening, a shutter section having one straight edge, a revoluble element adjacent thereto, said shutter section being pivotally connected at one end to said revoluble element, and links pivotally connecting the shutter section to said frame.

11. In a shutter, a frame defining an opening, a shutter section having one straight edge, a revoluble element adjacent thereto, said shutter section being pivotally connected at one end to said revoluble element, and links pivotally connecting the medial portion of said shutter section to said frame.

12. In a device of the character described, in combination, a plurality of sections having complemental edges, a movable actuating member having pivots thereon, pivots for said sections, means for relatively moving the pivots of said sections and actuating member, and relatively angularly movable members extending between and connected to the pivots on both said sections and actuating member for maintaining the edges of said sections substantially parallel during movement.

In testimony whereof I have hereunto signed my name.

AUGUSTO DINA.